United States Patent [19]

Nagano

[11] Patent Number: 5,012,692
[45] Date of Patent: May 7, 1991

[54] CHANGE-SPEED LEVER APPARATUS FOR USE IN BICYCLE

[75] Inventor: Masashi Nagano, Izumi, Japan

[73] Assignee: Shimano Industrial Company Limited, Osaka, Japan

[21] Appl. No.: 411,314

[22] Filed: Sep. 22, 1989

[30] Foreign Application Priority Data

Sep. 24, 1988 [JP] Japan ................................ 63-239266
May 10, 1989 [JP] Japan ................................. 1-117693

[51] Int. Cl.⁵ ................... B62M 25/04; B62K 23/06; G05G 5/06
[52] U.S. Cl. ........................................ 74/475; 74/142; 74/158; 74/479; 74/489; 74/502.2; 192/43.1
[58] Field of Search ................. 74/142, 158, 479, 475, 74/489, 502.2; 192/43.1

[56] References Cited

U.S. PATENT DOCUMENTS

| | | | |
|---|---|---|---|
| 3,633,437 | 1/1972 | Ishida | 74/489 |
| 3,665,775 | 5/1972 | Freeman | 74/142 |
| 3,972,247 | 8/1976 | Armstrong | 74/502.2 X |
| 4,055,093 | 10/1977 | Ross | 74/475 X |
| 4,100,820 | 7/1978 | Evett | 74/489 |
| 4,132,296 | 1/1979 | Evett | 74/489 X |
| 4,319,673 | 3/1982 | Kojima | 74/489 X |
| 4,325,267 | 4/1982 | Kojima | 74/489 |
| 4,343,201 | 8/1982 | Shimano | 74/489 X |
| 4,504,250 | 3/1985 | Juy | 74/475 X |
| 4,532,825 | 8/1985 | Nagano | 74/489 X |
| 4,586,396 | 5/1986 | Nagano | 74/473 R |
| 4,690,662 | 9/1987 | Nagano | 474/69 |
| 4,736,651 | 4/1988 | Nagano | 74/475 X |
| 4,751,852 | 6/1988 | Nagano | 74/475 X |
| 4,768,395 | 9/1988 | Tagawa | 74/489 |
| 4,840,081 | 6/1989 | Nagano | 74/502.2 |

FOREIGN PATENT DOCUMENTS

| | | |
|---|---|---|
| 60-149485 | 3/1984 | Japan . |
| 61-143275 | 6/1986 | Japan . |
| 229147 | 2/1969 | U.S.S.R. . |
| 2012893 | 8/1979 | United Kingdom . |
| 2169065 | 7/1986 | United Kingdom . |
| 2183796 | 6/1987 | United Kingdom . |

Primary Examiner—Allan D. Herrmann
Attorney, Agent, or Firm—Dickstein, Shapiro & Morin

[57] ABSTRACT

A speed change lever apparatus for use in a bicycle. The apparatus has a winding member for winding up a speed change control cable and a cable-pulling lever operable to pull the cable by causing the winding member to pivot only in a cable winding direction. The cable-pulling lever returns to its home position after completion of speed change operation. The improved apparatus includes a position maintaining mechanism for stepwisely maintaining a position of the winding member and a release lever operable to release the position maintaining mechanism. The release lever also returns to its home position after completion of release operation. At the respective home positions, the cable-pulling lever and the release lever are operable in substantially same directions to enable a cyclist to disregard the direction of lever operations. Further, the home positions of the levers are disposed at different yet adjacent locations relative to a direction normal to the lever operating directions. Hence, the lever operations, i.e. speed change operations do not require much movement of the cyclist's thumb. Consequently, the apparatus provides speedy and accurate speed change operations.

27 Claims, 5 Drawing Sheets

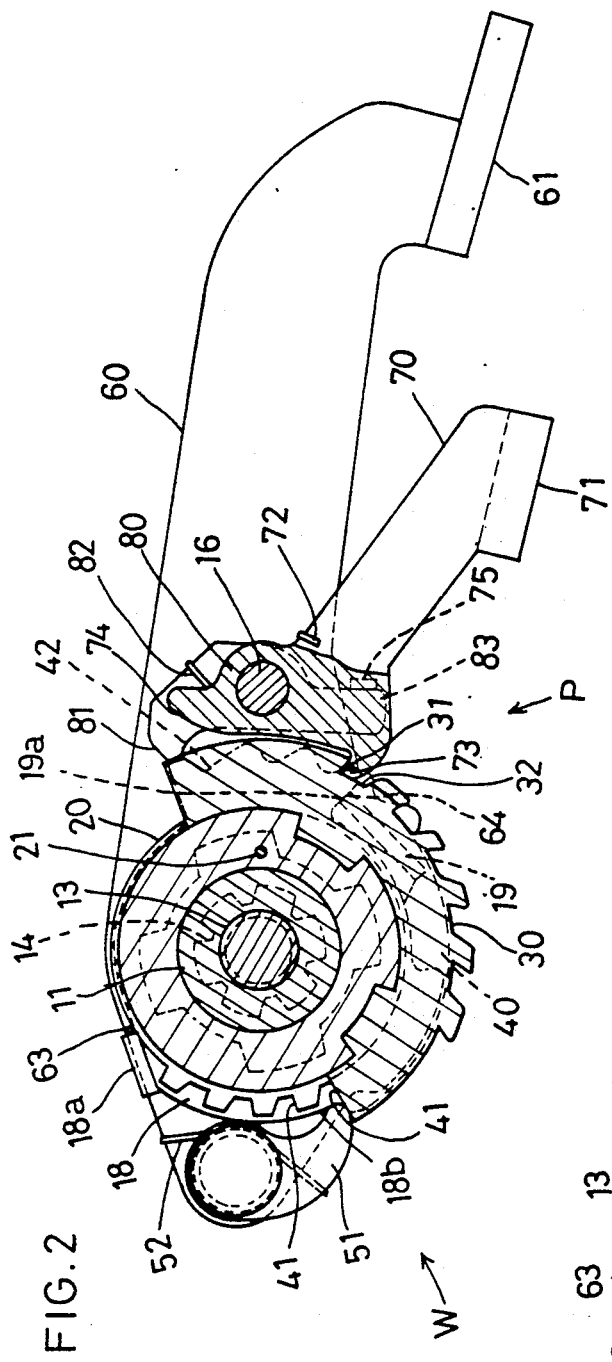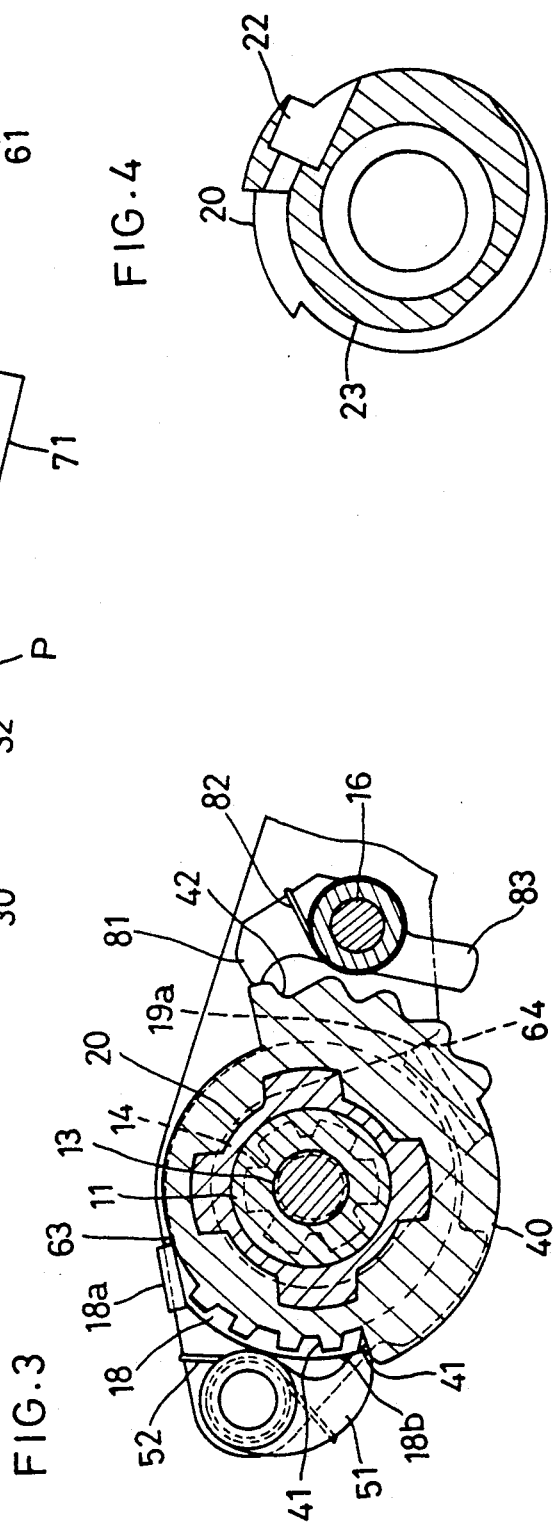

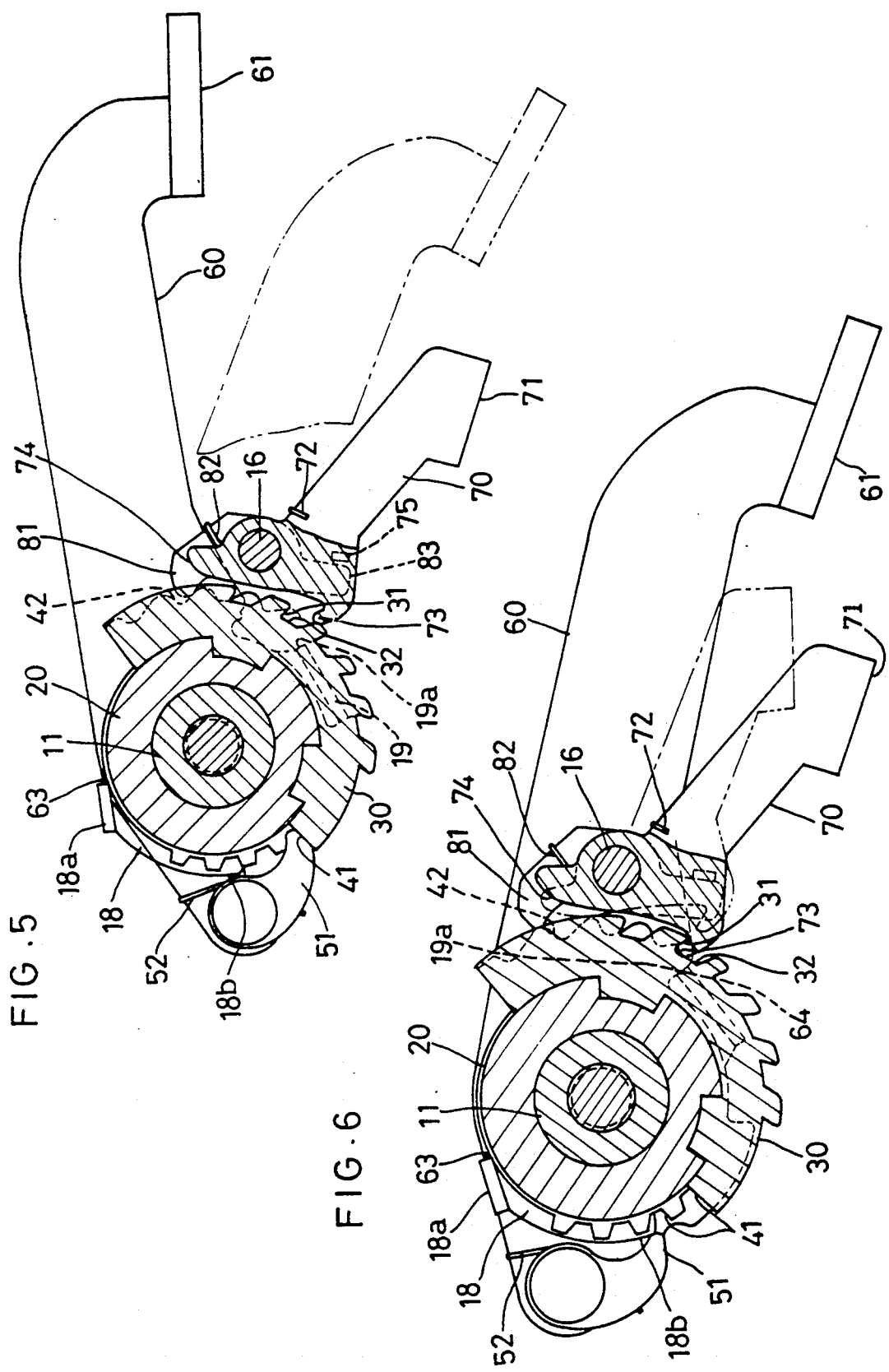

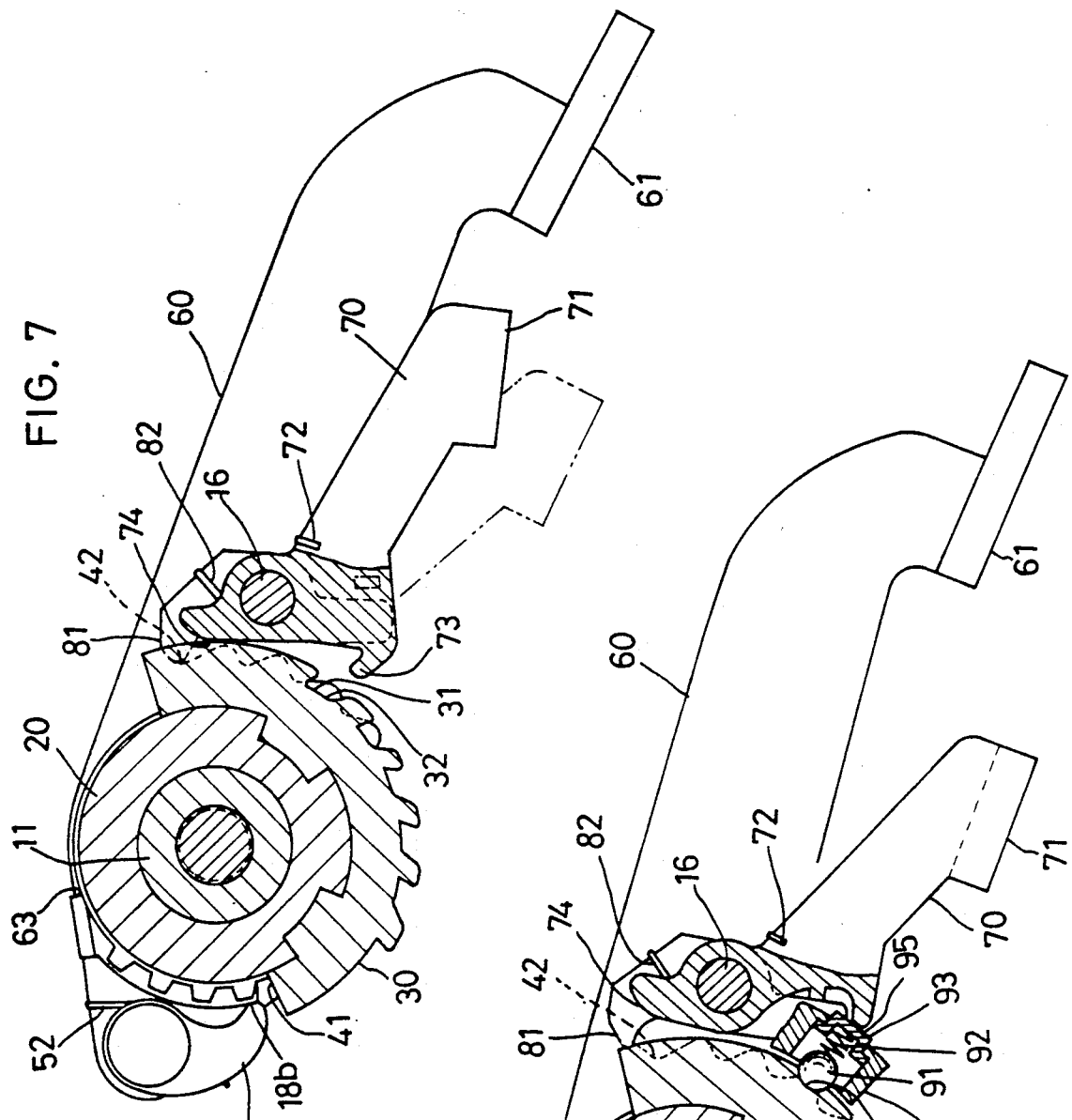

CHANGE-SPEED LEVER APPARATUS FOR USE IN BICYCLE

BACKGROUND OF THE INVENTION

1. Field of the Invention

The present invention relates to a speed change lever apparatus for use in a bicycle.

2. Description of the Related Arts

A conventional speed change lever apparatus is known, for example, from a Japanese laid-open patent No. 61-143275. This speed change lever apparatus includes a winding member for winding up a speed change control cable, the winding member being held in position by a frictional force, a single speed change lever for effecting a speed change operation, a pair of one-way mechanisms consisting of ratchet mechanisms arranged in opposition to each other between the speed change lever and the winding member, each ratchet mechanism having a projectable/retractable claw, and an urging means for urging the speed change lever back to an intermediate position between its forward and reverse strokes after the winding member is pivoted in a cable winding or cable rewinding direction by a forward or reverse operation of the speed change lever.

With the above-described conventional speed change lever apparatus, however, the speed change lever is operated in the two directions. Accordingly, for effecting a speed change operation, a cyclist must pay much of his attention to the direction of the lever operation. This is undesirable in terms of the cyclist's safety as well as speed change operation efficiency, because the speed change device will be operated into an unexpected speed position if the cyclist operates the lever in the wrong direction.

Further, in case the speed change lever apparatus is attached adjacent a grip portion of a steering handle bar of the bicycle and if the apparatus is to provide as many as five or six different speeds, the lever of the apparatus necessarily has a considerable operation stroke. This means that the cyclist needs to use two of his fingers, i.e. the thumb and index finger for a forward and reverse operation of the lever, respectively. As is well-known, the index finger contributes significantly to the handle gripping condition. Then, if this index finger has to move significantly away from the grip for a speed change operation as described above, this results in deterioration in the handle gripping condition, thereby to endanger the cyclist.

Moreover, in order to be operated not only by the cyclist's thumb but by the index finger, the speed change lever must be attached to an upper portion of the steering handle. As a result, for forwardly operating the lever, the cyclist must move his thumb clumsily upwards to the position of the lever, whereby the gripping condition can deteriorate in this case also, though may be less significant than the former case.

In view of the above-described state of the art, the primary object of the present invention is to provide such a speed change lever apparatus for use in a bicycle as permits a cyclist to carry out a speed change operation in a safe manner without losing much of his handle gripping force and also in a carefree manner without requiring much attention from the cyclist to the direction of the operation.

SUMMARY OF THE INVENTION

In order accomplish the above-noted object, according to a speed change lever apparatus for use in a bicycle relating to the present invention, the apparatus has: a fixed member; a winding member for winding up a speed change control cable, the winding member being pivotably supported to the fixed member and normally urged in a cable rewinding direction, and a cable-pulling lever for pulling the cable for a speed change operation as the lever is operated in a first direction against the urging force along the cable rewinding direction thereby to cause the winding member to pivot only in the cable winding direction via a one-way mechanism, the cable-pulling lever being returned to a home position thereof by cable-pulling lever urging means, the improvement comprising: a position maintaining mechanism including a first engaging member and a plurality of first engaging portions stepwisely engageable with the first engaging member to maintain a position of the winding member; and a release lever operable to release the engagement between the first engaging member and the first engaging portion with an operation of the release lever in a second direction thereby to effect a speed change operation by permitting the winding member to pivot in the cable rewinding direction with the cable rewinding urging force, the release lever being returned to a home position thereof by release lever urging means; the first direction of the cable-pulling lever and the second direction of the release lever at the respective home positions being substantially the same.

With the above-described features of the present invention, the speed change lever apparatus essentially consists of the cable-pulling lever and the release lever which levers can be operated at the respective home positions by the cyclist in substantially the same direction for pulling or releasing the speed change control cable respectively in order to carry out a desired speed change operation. As a result, the cyclist does not need to pay much attention to the direction of the lever operation. Further, since it is much easier for the cyclist to distinguish between the cable-pulling lever and the release lever than to distinguish between two opposite directions of a single speed change lever, the possibility of erroneous speed change operation can be minimized. Consequently, with the speed change lever apparatus of the present invention, a cyclist can carry out a speed change operation in a reliable, speedy and safe manner without having to pay much attention to the speed change lever operation per se.

Moreover, since the cable can be pulled or released by the two levers at their home positions in substantially the same one direction, it has become possible to reduce the operational stroke of the speed change lever apparatus to approximately a half of that of the conventional apparatus.

To the above-described construction, it is conceivable to additionally provide a limiting mechanism for limiting an amount of the pivotal motion of the winding member in the cable rewinding direction effected with an operation of the release lever to a predetermined amount.

With the addition of this limiting mechanism, the position of the winding member to be maintained can be freely set in both of the cable winding and cable rewinding directions.

Further, according to one preferred embodiment of the present invention, in a speed change lever apparatus for use in a bicycle, the apparatus has: a fixed member; a cable-pulling lever having a cable-pulling control portion and adapted for pulling and maintaining a speed change control cable for a speed change operation as the cable-pulling control portion is operated in a first direction, the cable-pulling lever being returned to a home position thereof after completion of the lever operation in the first direction, the speed change apparatus comprising: a release lever having a release control portion and operable to release the cable-pulling condition with an operation of the release control portion in a second direction, the release lever being returned to a home position thereof after completion of the lever operation in the second direction; the first direction of the cable-pulling lever and the second direction of the release lever at the respective home positions being substantially the same; when the cable-pulling lever and the release lever are rested at the respective home positions thereof, the cable-pulling control portion and the release control portion being located at different positions in a direction normal to the first and second directions and at the same time being located adjacent each other.

According to the apparatus having the above-described features, the cable-pulling control portion and the release control portion are not overlapped with each other in the common operating direction, and also these control portions are located adjacent each other. As a result, the cyclist can effect a speed change operation more easily without having to move his operating finger significantly. Consequently, speed change speed operations can be effected further speedily and more accurately and the cyclist's handle gripping condition will be further improved.

If the speed change lever apparatus having the above-described features is attached to the vicinity of the grip portion of the steering handle, it is also conceivable to dispose the cable-pulling control portion and the release control portion, at the home positions, side by side along the longitudinal direction of the grip portion.

With such positional arrangement, the cyclist can operate smoothly and easily both of the cable-pulling control portion and the release control portion, i.e. the cable-pulling lever and the release lever only by slightly moving his operating finger along the longitudinal direction of the grip portion in a very natural manner.

It is further conceivable to dispose the release control portion more distant from the grip portion than the cable-pulling control portion is.

With the above arrangements of the cable-pulling control portion and the release control portion, the control portions are located adjacent each other for easy lever operations and at the same time the existence of the release control portion will not interfere with the operation of the cable-pulling lever having a significantly long operational stroke.

Consequently, the present invention has achieved such a speed change lever apparatus for use in a bicycle as permits a cyclist to carry out a speed change operation in a safe manner without losing much of his handle gripping force and also in a carefree manner without requiring much attention from the cyclist to the direction of the lever operation.

Further and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 9 illustrate preferred embodiments of the present invention; in which, FIG. 1 is a partially cutaway vertical section showing one preferred embodiment of a speed change lever apparatus related to the invention, FIG. 2 is a cross sectional view, FIG. 3 is a cross section similar to FIG. 2, with a portion being cut away, FIG. 4 is a section view showing a winding member alone, FIGS. 5 through 7 are views illustrating operational conditions of the apparatus, FIG. 8 is a perspective view showing the apparatus being attached to a bicycle, and FIG. 9 is a view illustrating a further embodiment of the invention.

DESCRIPTION OF THE PREFERRED EMBODIMENTS

Preferred embodiments of the present invention will be particularly described hereinafter with reference to the accompanying drawings.

Figure 8:
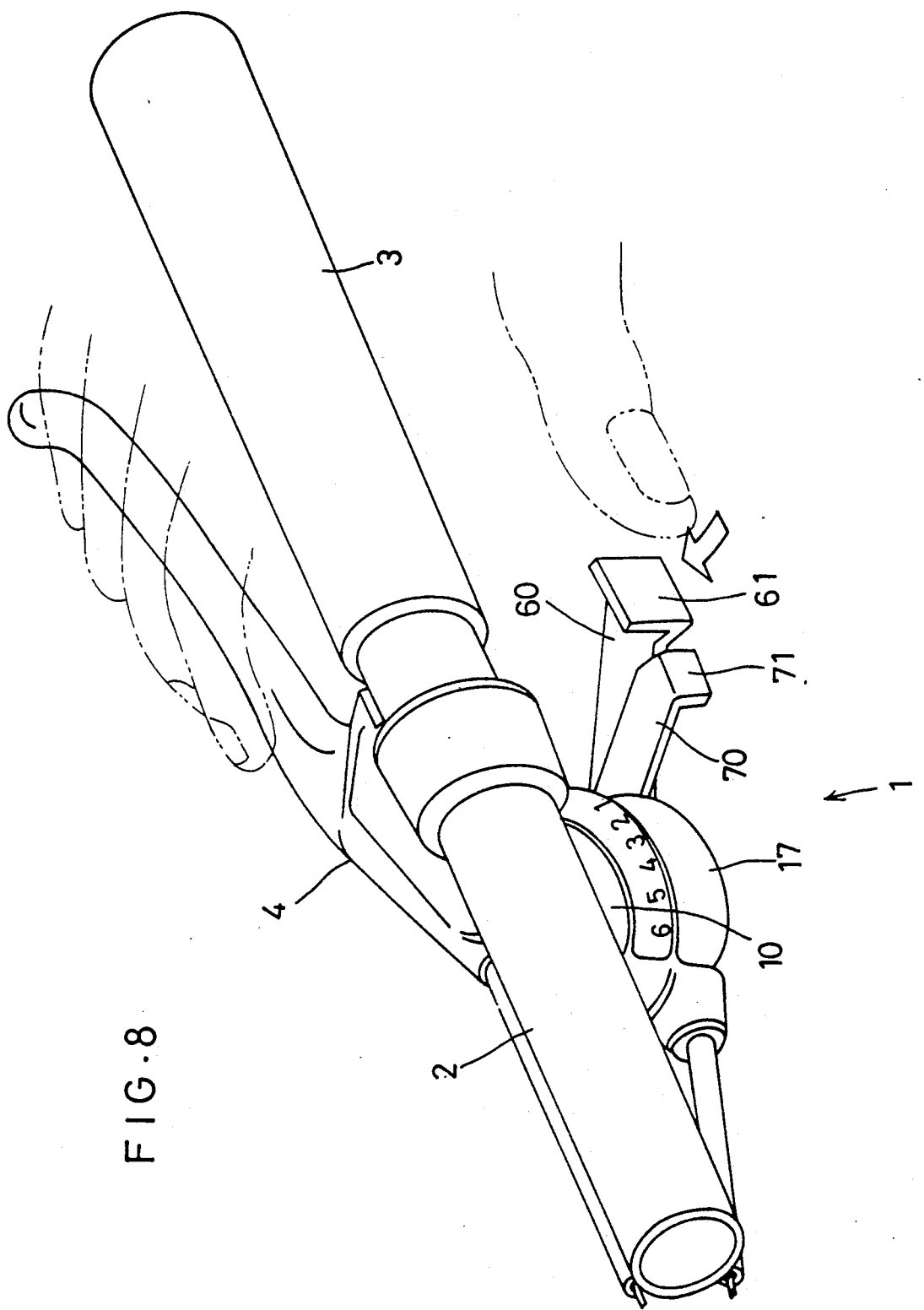

FIG. 8 is a perspective view showing a speed change lever apparatus 1 relating to the invention being attached to a steering handle bar 2 of a bicycle. This speed change lever apparatus 1 is designed for use mainly with a five to six speed rear derailleur.

The steering handle bar 2 consists of a hollow steel tube having a grip portion 3 covered with a grip member made of a resin material. A center axis of the handle 2 at this grip portion 3 extends substantially normal to a travelling direction of the bicycle and parallel with a horizontal plane. When a cyclist grips the grip portion 3 of this steering handle 2 in a normal condition, the inter-digital pads of the cyclist's hand contact an upper face of the grip 3 whereas his thumb is positioned under the handle 2.

This speed change lever apparatus 1 essentially consists of a cable-pulling lever 60 and a release lever 70. In FIG. 8, these levers 60 and 70 are both positioned at their home positions. Then, if a control portion 61 of the cable-pulling lever 60 is pushed from the home position in a direction denoted by an arrow in FIG. 8, a winding member 20 is pivoted in a cable winding direction (to be referred to briefly as a winding direction hereinafter), a speed change control cable is pulled by a predetermined amount and maintained at this position. On the other hand, if a control portion 71 of the release lever 70 is pushed for a small amount in substantially the same direction as the control portion 61, the winding member 20 is reversely pivoted in a cable rewinding direction (to be referred to briefly as a rewinding direction hereinafter), the previously wound cable is rewound by a predetermined amount.

Though not shown, the rear derailleur effects a speed change operation by pivoting a chain guide via a quadrople link mechanism relative to a member fixed to the bicycle body. Also, in this rear derailleur, the chain guide is normally positioned at a high speed sprocket by means of an urging force of a derailleur spring attached to the quadrople link mechanism. Thus, for effecting a speed change operation to a lower speed position, the link mechanism is pulled via the speed change control cable against the urging force of the derailleur spring.

In this particular embodiment, the speed change lever apparatus 1 is attached to a lower portion of the steering handle 2 adjacent the grip portion 3. Further, the cable-pulling lever 60 and the release lever 70 are so arranged as to extend under the grip portion 3. With this arrangement, both the cable-pulling lever 60 and the release lever 70 can be operated for a cable pulling or releasing operation by only a thumb of the cyclist' hand as gripping the grip portion 3. A first shaft 11, which constitutes the pivotal axis of the cable-pulling lever 60, and a second shaft 16, which constitutes the pivotal axis of the release lever 70, are so oriented as to extend substantially normal to the longitudinal axis of the steering handle 2 adjacent the grip portion 3 and at the same time in substantially parallel with each other. With this arrangement, both of the above cable pulling and releasing operations by the levers 60 and 70 can be effected in similar manners by the cyclist, namely, as he bends his thumb on substantially a horizontal plane to operate either the control portion 61 for a cable pulling operation or the control portion 71 for a cable releasing operation. Accordingly, the cyclist can safely and readily operate this speed change lever apparatus 1 without significantly destroying his handle gripping hand loop formed by the thumb and the other fingers of his hand as gripping the grip portion 3. Further, since both the cable-pulling lever 60 and the release lever 70 are operated in substantially the same direction, the cyclist has to pay little attention to the operational direction of the lever apparatus. At the respective home positions, the cable-pulling lever 60 and the release lever 70 are positioned adjacent to each other along the longitudinal direction of the grip portion 3, with the control portion 71 of the latter being positioned more distant from the grip portion 3 than the control portion 61 of the former is. With this additional arrangement, the control portion 71 of the release lever 70 can be easily operated with a top end of the cyclist's thumb, and futher a speed change operation skipping over a plurality of speed positions at one time is readily possible since the control portion 61 can be operated for a long stroke only with a slight movement of the cyclist's thumb toward the terminal end of the grip portion 3.

Figure 1:
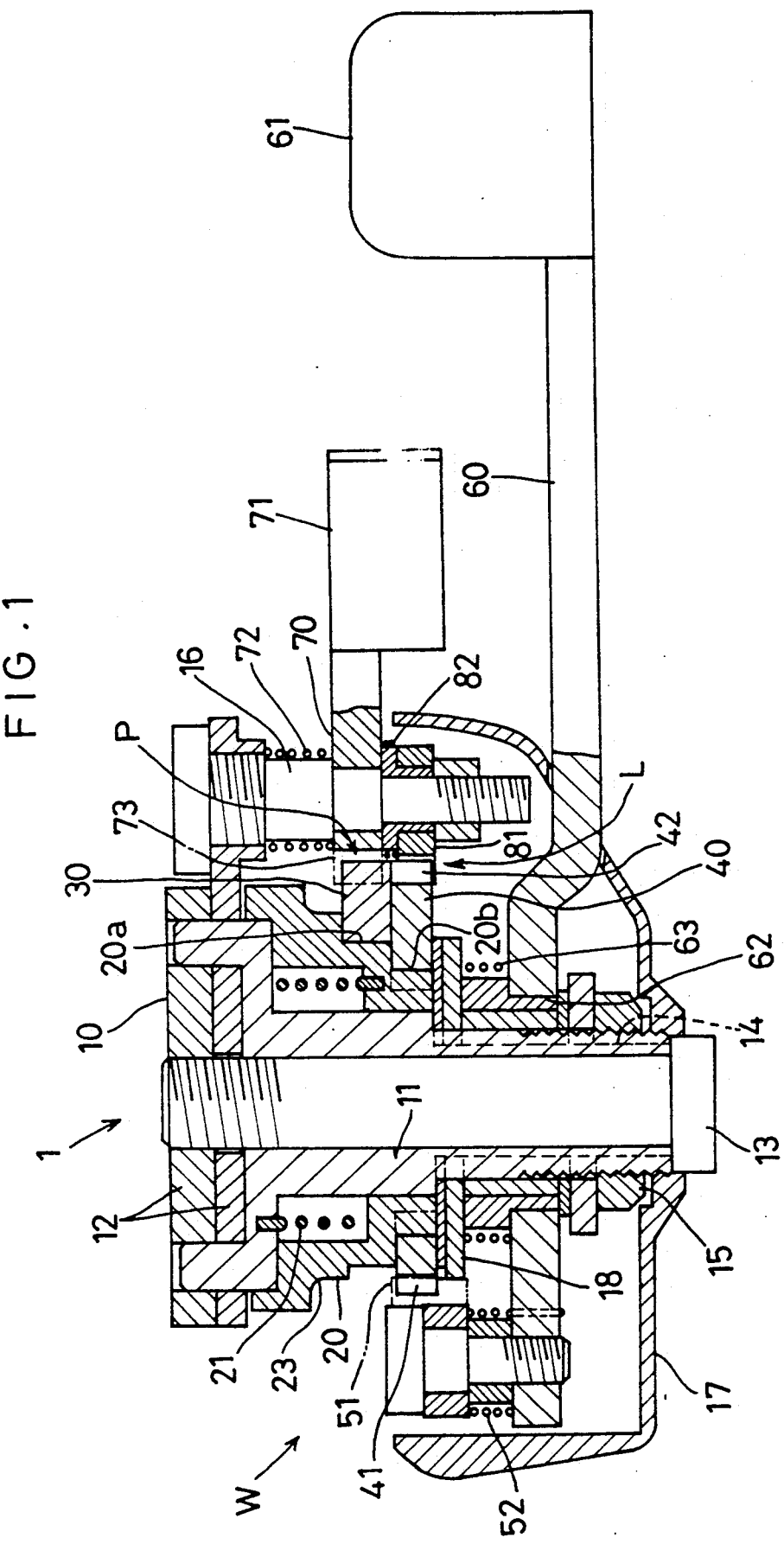

Referring now to FIG. 1, the speed change lever apparatus 1 includes a fixed member 10 consisting of a base element 12 to be attached to the steering handle 2 and the first shaft 11 fastened to the element 12 by means of a screw 13. The base element 12 is formed integrally with a bracket of a brake lever device 4 (FIG. 8) secured to the steering handle 2. And, this base element 12, as shown again in FIG. 8, includes a plate member having a hole engageable with the screw 13 and a further plate member having a through hole communicating with the hole and a further hole engageable with the second shaft 16 which pivotably supports the release lever 70.

Between the first shaft 11 and the base element 12, there are provided a plurality of engaging projections and engaging recesses, through a selective engagement between which the first shaft 11 is positionally adjustable relative to the base element 12 in the peripheral direction of the shaft 11. The first shaft 11 defines, at a leading end of its outer periphery, a plurality of concave portions 14 and a screw groove engageable with a nut 15. Through this engagement between the groove and the nut 15, the first shaft 11 undetachably supports the winding member 20 and the cable-pulling lever 60. Further, between a base end of this first shaft 11 and the winding member 20, there is interposed a spring 21 for urging the winding member 20 in the rewinding direction. Reference numeral 17 denotes a bowl-shaped cover for covering base ends of the winding member 20, the cable-pulling lever 60 and the release lever 70.

Referring now to FIGS. 1 and 4, the winding member 20 comprises a cylindrical structure having a cable-stopper portion 22 at one lateral side thereof. Further, at an intermediate portion in the outer periphery of the winding member 20, there is defined a cable-guiding groove 23 extending continuously with the stopper portion 22 and in the peripheral direction of the winding member 20. At one end of the outer periphery of the winding member 20 toward the first shaft, there are provided a pair of engaging portions 20a and 20b having engaging projections in the peripheral direction with a predetermined interdistance therebetween, with the two engaging portions 20a and 20b being positioned adjacent each other along the first shaft 11. Further, the upper engaging portion 20a unrotatably connects a semicircular positioning member 30 to be described later while the lower engaging portion 20b unrotatably connects a circular restricting member 40 (will be described later also), respectively relative to the winding member 20.

The cable-pulling lever 60 is formed of a metal plate and includes, at free end thereof, the control portion 61 which is despressed by a cyclist's thumb for pulling the speed change control cable. And, this lever 60 is pivotably supported to the first shaft 11 via a first shaft hole 62. On the other hand, above this cable-pulling lever 60, the first shaft 11 unrotatably supports, via the concave portion 14, a spring receiver plate 18 having a stopper portion 18a for stopping one end of a cable-pulling lever spring 63, whereas the other end of this spring 63 is secured to the cable-pulling lever 60, whereby the cable-pulling lever 60 is normally urged against the direction for cable pulling operation.

For setting a home position of the above-described cable-pulling lever 60, there is provided a mechanism illustrated in FIGS. 1 through 3, 5 and 6. This mechanism includes a plate-shaped position setting member 19 having an upwardly projecting, setting portion 19a, the setting member 19 being unrotatably fitted on the first shaft 11 via the concave portion 14. In operation, as this setting member 19 is brought into contact with a contact portion 64 of the cable-pulling lever 60 urged by the spring 63, the lever 60 is stopped at its home position. Incidentally, the setting portion 19a of the position setting member 19 is formed by a bent portion of the position setting member 19.

A one-way mechanism W for permitting the pivotal movement of the winding member 20 only in the winding direction, as illustrated in FIGS. 1 through 3, 5 and 6, is disposed between the restricting member 40 rotatable in unison with the winding member 20 and the cable-pulling lever 60. This one-way mechanism W includes a claw-shaped transmitting element 51 pivotally fitted on an end portion of the cable-pulling lever 60, a claw spring 52 for unidirectionally urging the transmitting element 51 and a plurality of transmitted portions 41 dispersed with a predetermined peripheral distance in a part of the outer periphery of the restricting member 40. Further, the spring receiver plate 18 includes a projection of a release cam 18b for releasing the engagement between the transmitting element 51 and the transmitted portion 41 when the cable-pulling lever 60 has returned to its home position.

The release control lever 70, as shown in FIGS. 1 and 2, is formed of a metal plate and includes, at free end thereof, the control portion 71 which is depressed by the cyclist's thumb for releasing the speed change control cable from the pulled condition. This release lever 70 is pivotably supported via its base end to the second shaft 16. Further, between the base element and this lever 70, there is interposed a release lever spring 72 for urging the release lever 70 against the release operation direction.

Next, a position maintaining mechanism P will be described with reference to FIGS. 2, 5 and 6. This position maintaining mechanism P essentially includes first engaging portions 31 consisting of a plurality of recesses defined in the positioning member 30 and a claw-shaped first engaging member 73 projected from the base end of the release lever 70. That is to say, the release lever 70 acts not only for the position maintaining function of this position maintaining mechanism P but for releasing this mechanism P. The first engaging member 73 is provided adjacent the first engaging portions 31 by the urging force of the release lever spring 72. Further, the first engaging portions 31 are formed by a plurality of claws peripherally dispersed with a predetermined distance about the positioning member 30. The first engaging member 73 and the claws of the positioning member 30 are inclined relative to the radial direction of the winding member 20. Accordingly, when the winding member 20 is pivoted in the winding direction, the first engaging portions 31 and the first engaging member 73 are freely engageable and disengageable with and from each other. On the other hand, when the winding member 20 is pivoted in the rewinding direction, the first portion 31 and the first engaging member 73 become engaged to restrict a pivotal motion of the winding member 20 thereby to maintain the present position of the winding member 20. Incidentally, when the winding member 20 is pivoted in the winding direction, the release lever 70 is pivoted with the engagement and disengagement between the first engaging portion 31 and the first engaging member 73.

The home position of the release lever 70 is determined through contact between the first engaging member 73 and a bottom portion 32 of the first engaging portion 31. Further, in order to restrict the release operation stroke of the release lever 70, at a side end of the base end of the release lever 70 opposite to the first engaging member 73, there is provided a contact portion 74 which comes into contact with the outer periphery of the positioning member 30. Also, in order to avoid interference between the release lever control portion 71 and the cable-pulling lever control portion 61, the control portion 71 at its home position is so disposed as to slightly project before the control portion 61 at its home position.

Between the restricting member 40 and the second shaft 16, there is provided a limiting mechanism L for limiting an amount of the winding-direction-wise pivotal movement of the winding member 20 effected with an operation of the release lever 70 to one pitch amount of the first engaging portions 31. In this limiting mechanism L, as illustrated in FIGS. 1 through 3, 5 and 6, the restricting member 40 includes, at its peripheral poriton opposite to the transmitted portion 41, a pluarlity of second engaging portions 42 consisting of concave portions. On the other hand, the second shaft 16 pivotably mounts a restricting claw member 80 having a claw-shaped second engaging member 81 selectively engageable with the second engaging portions 42. Further, the second engaging member 81 is urged toward the second engaging portions 42 by means of a restricting spring 82. With these arrangements, the amount of winding-direction-wise pivotal motion of the winding member 20 is limited. More particularly, the first engaging member 73 and the second engaging member 81 are so arranged that the second engaging member 81 is positioned at a projection between an adjacent pair of the second engaging portions 42 when the first engaging member 73 is engaged with the first engaging portion 31. The restricting claw member 80 includes, at a side opposite to the second engaging member 81, an extention portion 83. On the other hand, the release lever 70 includes, at a lower side thereof, an engaging projection 75 which comes into contact with the extention portion 83 so as to release the engagement between the second engaging member 81 and the second engaging portion 42. With these, when the release lever 70 is pivoted, the amount of winding-direction-wise pivotal motion of the winding member 20 can be limited within one pitch amount of the first engaging portions 31.

Next, operational functions of the speed change lever apparatus having the above-described construction will be particularly described.

FIGS. 1 and 2 show the apparatus being set at a highest speed position. In this, the cable-pulling lever 60 is rested at its home position by the urging force of the spring 63 and also by the contact between the contact portion 64 and the setting portion 19a of the position setting member 19. Further, the transmitting element 51 has its leading end contacting the release portion 18b of the spring receiver plate 18. On the other hand, the release lever 70 is rested at its home position by the contact between the first engaging member 73 and the bottom portion 32 of the first engaging portion 31.

First, a speed change operation into a lower speed position from the above highest speed position of FIGS. 1 and 2 will be described.

When the cyclist places the thumb of this handle-gripping hand into contact with the control portion 61 of the cable-pulling lever 60 and then pivots this counterclockwise in the tangential direction in FIG. 2, as illustrated in FIG. 5, the transmitting element 51 comes into engagement with one of the transmitted portions 41 of the restricting member 40, thereby to permit the manual forward force applied to the lever 60 to be transmitted via the restricting member 40 to the winding member 20. With this, the winding member 20 is pivoted in the winding direction to pull the speed change control cable. In this operation, if the stroke of the forward pivotal motion of the cable-pulling lever 60 reaches one pitch of the first engaging portions 31, the speed change operation is effected for one speed stage. Whereas, if the stroke reaches two pitches of the same, the speed change operation is effected for two speed stages. In this way, with a single thumb operation, the speed change operation is possible step-by-step or skipping over a plurality of positions at one time up to the maximum of three positions. For effecting a speed change operation over four speed positions, the cable-pulling lever 60 is once returned to its home position and then pivoted in the forward direction again. Thereafter, the speed change operation is possible step-by-step or skipping over a plurality of positions at one time.

When the desired lower speed position is realized, as shown in FIG. 6, the first engaging member 73 is engaged with one first engaging portion 31 corresponding to the lower speed position, thereby to prevent a return motion of the winding member 20. As a result, this lower speed position can be maintained reliably.

After the completion of the above-described speed change operation, if the cyclist releases his thumb from the control portion 61, the cable-pulling lever 60 is pivoted in the reverse direction (clockwise in FIG. 2) by the urging force of the spring 63 and is returned to and stopped at its home position through contact between the contact portion 64 and the setting portion 19a, as illustrated in FIG. 6. Then, the cable-pulling lever 60 becomes ready for a next speed change operation.

As described above, if the speed change lever apparatus of the present invention is used for providing five to six different speeds, a speed change operation from a high speed position to a lower speed position can be carried out smoothly by horizontally pushing the cable-pulling lever 60 with the thumb for two times.

Next, a speed change operation from the low speed position of FIG. 6 back to a higher speed position will be described.

As shown in FIG. 6, if the cyclist pushes the release lever 70 rested at its home position in the release direction which is substantially parallel with the operational direction of the cable-pulling lever 60, the first engaging member 73 of the release lever 70 moves away from the first engaging portion 31 of the position maintaining member 30, thereby to release the winding member 20 from the position-maintained condition. Then, this released winding member 20 is reversely pivoted in the rewinding direction by the urging force of the rewinding spring 21. In the course of this operation, the engagement between the extension portion 83 of the restricting claw member 80 and the engaging projection 75 of the release lever 70 is also released. Thus, as shown in FIG. 7, the second engaging member 81 urged by the restricting spring 82 comes into engagement with one of the second engaging portions 42 of the restricting member 40, thereby to limit the amount of the return movement of the winding member effected by the rewinding spring 21 within one pitch of the first engaging portion 31.

When the cyclist stops pushing the release lever control portion 71, the release lever 70 is pivoted reversely by the urging force of the release lever spring 72, and the engaging projection 75 again pushes the extension portion 83 thereby to release the engagement between the second engaging member 81 and the second engaging portion 42. At the same time, the winding member 20 as well as the positioning member 30 is reversely pivoted a litte further by the urging force of the rewinding spring 21, and the first engaging member 73 becomes engaged with one of the first engaging portions 31 which corresponds to one speed higher position. As this engagement prevents a reverse pivotal motion of the winding member 20 by the rewinding spring 21, this higher speed position can be maintained reliably.

Thus returned release lever 70 is rested at its home position through the contact between the bottom portion 32 of the first engaging portion 31 and the first engaging member 73, as illustrated in FIG. 6. Then, the release lever 70 is ready for a next release operation. Thereafter, if this release lever 70 at its home position is again pivoted, in the same manner as described above, the engagement between the first engaging member 73 and the first engaging portion 31 is released, and the winding member 20 is pivoted reversely by the force of the rewinding spring 21 to release the speed change control cable for effecting a speed change operation into one step higher speed position.

Some alternate embodiments of the invention will be specifically described next.

I. In the foregoing embodiment, the reverse pivotal motion of the winding member 20 is realized by the urging force of the rewinding spring 21. In place of this, the winding member 20 can be pivoted reversely, for example, by the urging force of the derailleur spring attached to the derailleur. That is, the rewinding spring 21 disposed between the winding member 20 and the spring receiver 18 of the fixed member 10 is not essential for the lever apparatus of the present invention.

II. The release lever 70 can be attached to another place than to the base member 12, for example, to the position setting member 19 or to the spring receiver plate 18.

III. In the foregoing embodiment, the positioning member 30 and the restricting member 40 are provided as entities separate from the winding member 20. Instead, these members 30 and 40 can be formed integrally with this winding member 20.

IV. The first engaging member 73 of the position maintaining mechanism P can be formed by other than the claw member projecting from the release lever 70. For instance, as illustrated in FIG. 9, a ball 91 can be used as this first engaging member 73. In this case, between this ball 91 and the release lever 70, a spring receiver 93 supports an urging spring 92 for urging the ball 91 toward the first engaging portions 31. And, the ball 91, the urging spring 92 and the spring receiver 93 are attached to the fixed member 10 by means of a support element 94. With this alternate construction, when the ball 91 comes into engagement with the first engaging portion 31, the urging spring 92 elastically resiles to cause a sharp drop in the load acting on the cable-pulling lever 60, and this sharp drop in the load can provide a clicking feel to the cyclist's hand operating the lever 60 for each change speed operation. As a result, the cyclist can be aware what speed position he has shifted into. In this construction, it is to be noted, the release lever 70 is stopped at its home position through contact between the lever 70 and a contact portion 95 of the spring receiver 93.

V. In the foregoing embodiment, the first engaging portions 31 of the position maintaining mechanism P are peripherally dispersed relative to the winding member 20. Alternately, these first engaging portions 31 can be disposed along the axis of the first shaft 11 relative to the winding member 20. For instance, in the above described case of FIG. 9 where the ball 91 is used as the first engaging member 73, at one end of the winding member 20 relative to the axis of the first shaft 11, there is fixed a circular link plate having a smaller diameter than this winding member 20, and this circular link plate forms the first engaging portions 31 in its periphery of upper or lower side; whereas, the release lever 70 is attached to the position setting member 19 or to the spring receiver plate 18. With this construction, a disadvantageous enlargement of the winding member 20 can be effectively prevented and the pivot of the release lever 70 can be located closer to the first shaft 11. As a result, the entire speed change lever apparatus can be formed compact, and the apparatus can be attached still closer to the grip portion 3, whereby the thumb operations of the cable-pulling lever 60 and the release lever 70 will be further facilitated.

VI. For effecting a speed change operation from a low speed position to a higher speed position, the construction of the foregoing embodiment requires a plurality of thumb operations of the release control lever 70 for a number of times corresponding to the desired number of speed positions to be changed over, because the pivotal amount of the winding member 20 is limited to one pitch of the first engaging portions 31 by the engagement between the second engaging member 80 of the restricting claw member 80 and the second engaging portion 81. Instead, with elimination of the restricting claw member 80 of the limiting mechanism L, it can be arranged so that the amount of engagement between the first engaging member 73 and the first engaging portion 31 may be controlled according to an operational amount of the release lever 70 thereby to allow the winding member 20 to pivot step-by-step or skipping over a plurality of steps for one time.

VII. The setting portion 19a for setting the home position of the cable-pulling lever 60 can be formed integrally with the fixed member 10.

VIII. In the foregoing embodiment, the home position of the release lever 70 is restricted by the contact between the bottom portion 32 of the first engaging portion 31 and the first engaging member 73. Instead, this home position of the release lever 70 can be restricted by an integral portion of the fixed member 10 similar to the setting portion 19a used for restricting the home position of the cable-pulling lever 60.

IX. The base member 12 can be fixed to the steering handle bar 2 directly or indirectly through a band element.

X. The speed change lever apparatus of the invention can be used with a front derailleur rather than with the rear derailleur.

XI. In the foregoing embodiment, the one-way mechanism W includes the claw-shaped transmitting element 51 and the transmitted portions 41 formed in the outer periphery of the positioning member 30. Alternately, this one-way mechanism W can be of a friction type.

XII. In the foregoing embodiment, the cable-pulling lever 60 and the winding member 20 share the same pivot shaft 11. Instead, the lever 60 and the member 20 can use separate pivot shafts.

XIII. In the foregoing embodiment, the attaching orientations of the first and second shafts 11 and 16 are vertical. In place of this, these shafts 11 and 16 can be oriented any other directions where the cable-pulling lever control portion 61 and the release lever control portion 71 can be most conveniently operated by the thumb or another finger of the cyclist's hand gripping as the grip portion 3. For instance, the control portions 61 and 71 can be operated easily also when the first shaft 11 and the second shaft 16 are oriented in parallel with the axis of the steering handle bar 2.

XIV. The extending positions of the cable-pulling lever 60 and the release lever 70 may be conveniently adjusted according to the extending direction of the grip portion 3. For example, when the longitudinal axis of this grip portion 3 of the steering handle bar 2 extends along the travelling direction of the bicycle, the inter-digital pads of the cyclist's hand as gripping the grip portion 3 are located on the outer side face of the grip portion 3 facing the outside of the bicycle body. In this case, accordingly, the cable-pulling lever 60 and the release lever 70 are caused to extend from the inner side face of the grip portion 3 facing the cyclist.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A speed change lever apparatus for use in a bicycle, the apparatus comprising:
   a fixed member;
   a cable-pulling lever supported by the fixed member and operable to effect a speed change by pulling and maintaining a speed change control cable, the cable-pulling lever being returned to a home position thereof after completion of the lever operation;
   a release lever supported by the fixed member and operable to effect the speed change by loosening the speed change control cable, the release lever being returned to a home position thereof whenever operated;
   control portions defined in the cable-pulling lever and the release lever, respectively, to be operable in substantially the same directions from the home positions thereof and located at different positions in a direction normal to their operating directions and at the same time located adjacent each other in the home positions thereof.

2. A speed change lever apparatus as defined in claim 1, wherein said cable-pulling control portion and said release control portion at the home positions thereof being disposed side by side along the longitudinal direction of a grip portion when said lever apparatus is attached to the vicinity of the grip portion of the steering handle.

3. A speed change lever apparatus as defined in claim 2, wherein said release control portion is disposed more distant from said grip portion than said cable-pulling control portion is when said lever apparatus is attached to the vicinity of the grip portion of the steering handle.

4. A speed change lever apparatus as defined in claim 3, wherein said cable-pulling lever pivots about a first shaft relative to said fixed member whereas said release lever pivots about a second shaft relative to said fixed member, said first shaft and said second shaft being oriented substantially in parallel with each other.

5. A speed change lever apparatus as defined in claim 4, wherein said cable-pulling control portion and said release control portion at the respective home positions thereof are located at one side of said steering handle bar and opposite to a side of the handle bar coming into contact with inter-digital pads of a cyclist's hand as gripping said grip portion, said first and second directions being set along a bending direction of the thumb of the cyclist's hand as gripping the grip portion.

6. A speed change lever apparatus as defined in claim 5, wherein said steering handle comprises a flat handle bar, said cable-pulling control portion and said release control portion being located under said handle bar at said home positions when said lever apparatus is attached to the vicinity of the grip portion of the steering handle.

7. A speed change lever apparatus as defined in claim 1, wherein said cable-pulling lever pivots about a first shaft relative to said fixed member, said cable-pulling control portion and said release control portion at said home positions being arranged side by side along a direction normal to said first shaft, with said release control portion being located closer to said first shaft than said cable-pulling control portion is.

8. A speed change lever apparatus for use in a bicycle, the apparatus comprising:
 a fixed member,
 a winding member pivotably supported by the fixed member for winding up a speed change control cable, the winding member being normally urged in a cable rewinding direction, and
 a cable-pulling lever supported by the fixed member and operable against an urging force along the cable rewinding direction thereby to effect a speed change by rotating the winding member in a cable winding direction,
 a position maintaining mechanism including a first engaging member and a first engaging portion having a plurality of recesses and stepwisely engageable with the first engaging member to maintain a position of the winding member through engagement between the first engaging member and the first engaging portion,
 a release lever supported by the fixed member and operable to release the engagement between the first engaging member and the first engaging portion to effect a speed change by rotating the winding member in the rewinding direction under the urging force along the rewinding direction, and
 a limiting mechanism including a second engaging portion having a plurality of recesses and a second engaging member stepwisely engageable with the second engaging portion with an operation of the release lever to limit a pivotal amount of the winding member in the cable rewinding direction to a predetermined amount through engagement between the second engaging portion and the second engaging member,
 wherein the cable-pulling lever and the release lever extend from the same side with respect to the fixed member and are operable in substantially the same directions.

9. A speed change lever apparatus for use in a bicycle as defined in claim 8, wherein the limiting mechanism limits the pivotal amount of the winding member in the cable rewinding direction within a range not more than one pitch excluding one pitch itself of the stepwise engagement established by the position maintaining mechanism.

10. A speed change lever apparatus for use in a bicycle as defined in claim 9 wherein the cable-pulling lever is pivoted to a first shaft and the release lever is pivoted to a second shaft, the first and second shafts being substantially parallel to each other, wherein the winding member is pivotably supported about the first shaft, and wherein the first and second engaging portions are arranged around the first shaft to be rotatable with the winding member.

11. A speed change lever apparatus for use in a bicycle as defined in claim 10 wherein said fixed member is arranged such that when the speed change lever apparatus is attached to a bicycle handlebar, with both of the cable-pulling lever and release lever being positioned below the handlebar, the first and second shafts are oriented in a vertical direction.

12. A speed change lever apparatus for use in a bicycle as defined in claim 11 wherein the first engaging member is defined integrally with the release lever, and wherein the release lever is urged in a direction opposite to an operating direction by urging means thereby to engage the first engaging member with the first engaging portion.

13. A speed change lever apparatus for use in a bicycle as defined in claim 12 wherein the second engaging member is defined separately from the release lever and constantly urged toward the second engaging portion to be moved away from the second engaging portion when the release lever is not operated.

14. A speed change lever apparatus for use in a bicycle as defined in claim 13, the apparatus further comprising a one-way mechanism mounted between the cable-pulling lever and the winding member to permit return movement of the cable-pulling lever relative to the winding member, wherein the cable-pulling lever is urged to return to a home position thereof whenever operated.

15. A speed change lever apparatus for use in a bicycle as defined in claim 14 wherein the cable-pulling lever and the release lever include control portions, respectively, located at different positions in a direction normal to operating directions and at the same time located adjacent each other in the home positions thereof.

16. A speed change lever apparatus for use in a bicycle as claimed in claim 15 wherein the control portions of the cable-pulling lever and release lever are arranged in a direction normal to the first shaft, respectively.

17. A speed change lever apparatus as in claim 16 wherein the control portion of the release lever is located closer to the first shaft than the control portion of the cable-pulling lever.

18. A speed change lever apparatus for use in a bicycle with a speed change control cable normally urged in a cable rewind direction by a derailleur spring, the apparatus comprising:
 a fixed member,
 a winding member pivotably supported by the fixed member for winding up a speed change control cable, and
 a cable-pulling lever supported by the fixed member and operable to effect a speed change by rotating the winding member in a cable winding direction,
 a position maintaining mechanism including a first engaging member and a first engaging portion having a plurality of recesses and stepwisely engageable with the first engaging member to maintain a position of the winding member through engagement between the first engaging member and the first engaging portion,
 a release lever supported by the fixed member and operable to release the engagement between the first engaging member and the first engaging portion to effect a speed change by rotating the winding member in the rewinding direction, and
 a limiting mechanism including a second engaging portion having a plurality of recesses and a second engaging member stepwisely engageable with the second engaging portion with an operation of the release lever to limit a pivotal amount of the winding member in the cable rewinding direction to a predetermined amount through engagement between the second engaging portion and the second engaging member, wherein the cable-pulling lever and the release lever extend from the same side with respect to the fixed member and are operable in substantially the same directions.

19. A speed change lever apparatus for use in a bicycle as defined in claim 18 wherein the limiting mechanism limits the pivotal amount of the winding member in the cable rewinding direction within a range not more than one pitch excluding one pitch itself of the stepwise engagement established by the position maintaining mechanism.

20. A speed change lever apparatus for use in a bicycle as defined in claim 19 wherein the cable-pulling lever is pivoted to a first shaft and the release lever is pivoted to a second shaft, the first and second shafts being substantially parallel to each other, wherein the winding member is pivotably supported about the first shaft, and wherein the first and second engaging portions are arranged around the first shaft to be rotatable with the winding member.

21. A speed change lever apparatus for use in a bicycle as defined in claim 20 wherein said fixed member is arranged such that when the speed change lever apparatus is attached to a bicycle handlebar, with both of the cable-pulling lever and release lever being positioned below the handlebar, the first and second shafts are oriented in a vertical direction.

22. A speed change lever apparatus for use in a bicycle as defined in claim 21 wherein the first engaging member is defined integrally with the release lever, and wherein the release lever is urged in a direction opposite to an operating direction by urging means thereby to engage the first engaging member with the first engaging portion.

23. A speed change lever apparatus for use in a bicycle as defined in claim 22 wherein the second engaging member is defined separately from the release lever and constantly urged toward the second engaging portion to be moved away from the second engaging portion when the release lever is not operated.

24. A speed change lever apparatus for use in a bicycle as defined in claim 23, the apparatus further comprising a one-way mechanism mounted between the cable-pulling lever and the winding member to permit return movement of the cable-pulling lever relative to the winding member.

25. A speed change lever apparatus for use in a bicycle as defined in claim 24 wherein the cable-pulling lever and the release lever include control portions, respectively, located at different positions in a direction normal to operating directions and at the same time located adjacent each other in the home positions thereof.

26. A speed change lever apparatus for use in a bicycle as defined in claim 25 wherein the control portions of the cable-pulling lever and release lever are arranged in a direction normal to the first shaft, respectively.

27. A speed change lever apparatus as in claim 26 wherein the control portion of the release lever is located closer to the first shaft than the control portion of the cable-pulling lever.

* * * * *